US011610437B2

(12) United States Patent
Boic

(10) Patent No.: US 11,610,437 B2
(45) Date of Patent: *Mar. 21, 2023

(54) FACE LIVENESS DETECTION SYSTEMS AND METHODS

(71) Applicant: RealNetworks LLC, Seattle, WA (US)

(72) Inventor: Milko Boic, Seattle, WA (US)

(73) Assignee: REALNETWORKS LLC, Seattle, WA (US)

( * ) Notice: Subject to any disclaimer, the term of this patent is extended or adjusted under 35 U.S.C. 154(b) by 16 days.

This patent is subject to a terminal disclaimer.

(21) Appl. No.: 17/222,869

(22) Filed: Apr. 5, 2021

(65) Prior Publication Data

US 2021/0224523 A1 Jul. 22, 2021

Related U.S. Application Data

(63) Continuation of application No. 16/377,108, filed on Apr. 5, 2019, now Pat. No. 10,997,396.

(51) Int. Cl.
*G06V 40/16* (2022.01)
(52) U.S. Cl.
CPC .......... *G06V 40/172* (2022.01); *G06V 40/161* (2022.01); *G06V 40/174* (2022.01)
(58) Field of Classification Search
CPC .......... G06K 9/00288; G06K 9/00302; G06K 9/00228
See application file for complete search history.

(56) References Cited

U.S. PATENT DOCUMENTS

| 8,457,367 | B1 * | 6/2013 | Sipe | G06F 21/32 |
| | | | | 382/118 |
| 10,346,990 | B2 * | 7/2019 | Martin | G06V 30/142 |
| 2008/0080748 | A1 * | 4/2008 | Sukegawa | G06V 40/10 |
| | | | | 382/118 |
| 2010/0021019 | A1 * | 1/2010 | Lin | H04N 5/23219 |
| | | | | 382/118 |

(Continued)

FOREIGN PATENT DOCUMENTS

| JP | 2017-742 A | 1/2017 |
| KR | 10-2018-0098367 A | 9/2018 |

(Continued)

OTHER PUBLICATIONS

PCT/US2020/026188—International Search Report and Written Opinion, dated Jul. 23, 2020, 10 pages.

(Continued)

*Primary Examiner* — Ming Y Hon
(74) *Attorney, Agent, or Firm* — Seed IP Law Group LLP

(57) ABSTRACT

Technologies are provided for assessing liveness of a subject presented to a set of one or more cameras. A first image and a second image depicting a face are captured during a first time period, and a third image and a fourth image depicting the face are captured during a second time period. A first variance in facial appearance is detected between the first depiction of the face and the third depiction of the face, and a second variance in facial appearance is detected between the second depiction of the face and the fourth depiction of the face. A liveness of a person is verified based on a determination that the first variance in facial appearance corresponds in time to the second variance in facial appearance.

20 Claims, 10 Drawing Sheets

(56) References Cited

U.S. PATENT DOCUMENTS

| | | | |
|---|---|---|---|
| 2011/0185402 A1* | 7/2011 | Wang | H04L 63/10 |
| | | | 709/206 |
| 2011/0299741 A1* | 12/2011 | Zhang | G06V 40/161 |
| | | | 382/117 |
| 2013/0315487 A1* | 11/2013 | Turetzky | G06T 15/04 |
| | | | 382/195 |
| 2016/0073040 A1 | 3/2016 | Jen et al. | |
| 2017/0169303 A1* | 6/2017 | Connell, II | G06V 40/174 |
| 2018/0150708 A1* | 5/2018 | Martin | G06V 40/19 |
| 2019/0073521 A1 | 3/2019 | Hsu | |
| 2019/0197331 A1* | 6/2019 | Kwak | G06V 10/82 |
| 2020/0242336 A1 | 7/2020 | Boic | |

FOREIGN PATENT DOCUMENTS

| | | |
|---|---|---|
| WO | 2018/072028 A1 | 4/2018 |
| WO | 2020/205981 A1 | 10/2020 |

OTHER PUBLICATIONS

Ye et al., "Towards General Motion-Based Face Recognition," School of Computing, National University of Singapore, 8 pages.

Zhang et al., "Real-time Action Recognition with Enhanced Motion Vector CNNs," Shenzhen key lab of Comp. Vis. & Pat. Rec., Shenzhen Institutes of Advanced Technology, 9 pages.

\* cited by examiner

FACE LIVENESS DETECTION SYSTEMS AND METHODS

BACKGROUND

Technical Field

The present disclosure relates to systems and methods for processing facial images.

Description of the Related Art

The popularity of technologies for automatically recognizing persons by using facial images has rapidly increased due to the ease and convenience for users. However, the ease and convenience of some facial biometric recognition technologies also involves the risk of certain security vulnerabilities. Some previous generations of devices, for example, were configured to unlock in response to capturing a static image depicting an authorized user's face—a feature which users quickly realized could be exploited to gain unauthorized access to a device using a photograph of the authorized user's face.

Technologies have since been developed to protect against unauthorized access using static images or other methods of spoofing an identity. Some devices and systems are configured to require dynamic image capturing of a user in motion or otherwise demonstrating the liveness of the user. Such devices and systems may also be vulnerable to identity spoofing by, e.g., displaying a video of the authorized user to a camera. Some devices and systems are configured to detect the presence of a three-dimensional face in connection with an authorization attempt. This approach uses specialized cameras and light-emitting devices (e.g., lasers) to detect the presence of a face in three dimensions and may still be vulnerable to some spoofing attacks that mimic a user's identity. Existing computer systems and technologies are insufficiently configured to protect against spoofing attacks without the use of specialized equipment while maintaining an appropriate balance of convenience and ease for the user.

BRIEF SUMMARY

A method may be summarized as including obtaining a first face image and a second face image both captured during a first time period; obtaining a third face image captured during a second time period subsequent to the first time period; verifying liveness of a person depicted in one or more face images by at least performing a comparison between first information regarding the first face image and second information regarding the second face image; determining, based on the comparison, that the first face image and the second face image are consistent with each other according to a set of consistency criteria; and detecting a first variance in facial expression or face orientation between a face depicted in the first face image and a face depicted in a third face image of the third image; and performing an authentication process using at least one face image of the first face image, the second face image, and the third face image.

Performing the authentication process may be performed as a result of detecting the first variance in facial expression or face orientation and determining the consistency between the first face image and the second face image. Performing the authentication process may include determining an identity of a person depicted in the at least one face image, and determining that the first face image and the second face image are consistent is performed as a result of performing the authentication process. Performing the authentication process may include determining an identity of a person depicted in the at least one face image, and detecting the first variance in facial expression or face orientation is performed as a result of performing the authentication process.

The method may further include receiving a fourth image captured in the second time period; detecting a second variance in facial expression or face orientation between a face depicted in the second face image and a fourth face image in the fourth image; and determining that the first variance in facial expression or face orientation corresponds in time to the second variance in facial expression or face orientation. The authentication process may be performed as a result of determining that the first variance in facial expression or face orientation corresponds in time to the second variance in facial expression or face orientation.

The method may further include causing a first camera to capture the first image during the first time period; causing a second camera to capture the second image during the first time period; and causing the first camera to capture the third image during the second time period. The first information may include information representative of a size of the first face image, the second information includes information representative of a size of the second face image, and determining that the first face image and the second face image are consistent includes determining a match between the size of the first face image and the size of the second face image. The first information may include information representative of an orientation of the face depicted in the first face image, the second information includes information representative of an orientation of the face depicted in the second face image, and determining that the first face image and the second face image are consistent includes determining a match between the orientation of the face in the first face image and the orientation of the face in the second face image. The first information may include information representative of a first position in space of the face depicted in the first face image, the second information includes information representative of a second position in space of the face depicted in the second face image, and determining that the first face image and the second face image are consistent includes determining that the first position in space matches the second position in space. The first information may include a first biometric signature generated for the first face image and the second information includes a second biometric signature generated for the second face image, and determining that the first face image and the second face image are consistent with each other according to the set of consistency criteria includes determining that a difference between the first biometric signature and the second biometric signature satisfies the set of consistency criteria. Performing the authentication process may include comparing a biometric signature generated from the at least one face image with a stored biometric signature; and determining an identity of a person depicted in the at least one face image based on a result of comparing the biometric signature and the stored biometric signature.

A system may be summarized as including one or more processors; and non-transitory memory storing a set of instructions that, as a result of execution by the one or more processors, cause the system to obtain a first face image and a second face image both captured during a first time period; obtain a third face image captured during a second time period subsequent to the first time period; perform a comparison between first information regarding the first face image and second information regarding the second face image; determine, based on the comparison, that the first face image and the second face image are consistent with each other according to a set of consistency criteria; detect a first variance between a face depicted in the first face image and a face depicted in a third face image of the third image; and verify liveness of a person presented to the system as a result of a determination that the first face image and the second face image are consistent with each other and as a result of detection of the first variance between the first face image and the third face image.

The system may further include a first camera having a first position and orientation; and a second camera having a second position and orientation, wherein the first camera captures the first face image and the third face image, and the second camera captures the second face image. The memory may store further instructions that, as a result of execution by the one or more processors, causes the system to receive a fourth image captured by the second camera in the second time period; detect a second variance between a face depicted in the second face image and a fourth face image in the fourth image; and determine that the first variance corresponds in time to the second variance. The first information and the second information each may include information representative of one or more characteristics selected from a size of a face image, an orientation of a face depicted a face image, a position in space of a face depicted in the face image, and a facial expression of the face depicted in the face image, and wherein execution of the instructions further causes the system to determine whether there is a match between the information representative of the one or more characteristics for the first information and the information representative of the one or more characteristics for second information.

Execution of the instructions may further cause the system to detect, in connection with detection of the first variance between the face depicted in the first face image and the face depicted in a third face image of the third image, a variance in a facial appearance attribute including at least one of facial expression or face orientation between the face depicted in the first face image and the face depicted in the third face image.

At least one non-transitory computer-readable medium storing instructions that, as a result of execution by one or more processors, may cause one or more processors to obtain a first face image and a second face image both captured during a first time period; obtain a third face image captured during a second time period subsequent to the first time period; perform a comparison between first information regarding the first face image and second information regarding the second face image; determine, based on the comparison, that the first face image and the second face image are consistent with each other according to a set of consistency criteria; detect a first variance between a face depicted in the first face image and a face depicted in a third face image of the third image; and verify liveness of a person as a result of a determination that the first face image and the second face image are consistent with each other and as a result of detection of the first variance between the first face image and the third face image.

The at least one non-transitory computer-readable medium, may store further instructions that, as a result of execution by the one or more processors, cause the one or more processors to receive a fourth image captured in the second time period; detect a second variance between a face depicted in the second face image and a fourth face image in the fourth image; and determine that the first variance corresponds in time to the second variance.

The at least one non-transitory computer-readable medium, may store further instructions that, as a result of execution by the one or more processors, cause the one or more processors to obtain the first face image from a first camera having a first position and orientation; and obtain the second face image from a second camera having a second position and orientation.

The at least one non-transitory computer-readable medium, may store further instructions that, as a result of execution by the one or more processors, cause the one or more processors to generate a first biometric signature of the first face image; generate a second biometric signature of the second face image; and determine that the first face image and the second face image are consistent with each other based on a comparison between the first biometric signature and the second biometric signature. The first information and the second information each may include information representative of one or more characteristics selected from a size of a face image, an orientation of a face depicted a face image, a position in space of a face depicted in the face image, and a facial expression of the face depicted in the face image, and wherein the at least one non-transitory computer-readable medium stores further instructions that, as a result of execution by the one or more processors, cause the one or more processors to determine whether there is a match between the information representative of the one or more characteristics for the first information and the information representative of the one or more characteristics for second information.

The at least one non-transitory computer-readable medium, may store further instructions that, as a result of execution by the one or more processors, cause the one or more processors to detect, in connection with detection of the first variance between the face depicted in the first face image and the face depicted in a third face image of the third image, a variance between the face depicted in the first face image and the face depicted in the third face image. The first variance may be of a facial appearance attribute including at least one of a facial expression or a face orientation.

DETAILED DESCRIPTION

Figure 1:
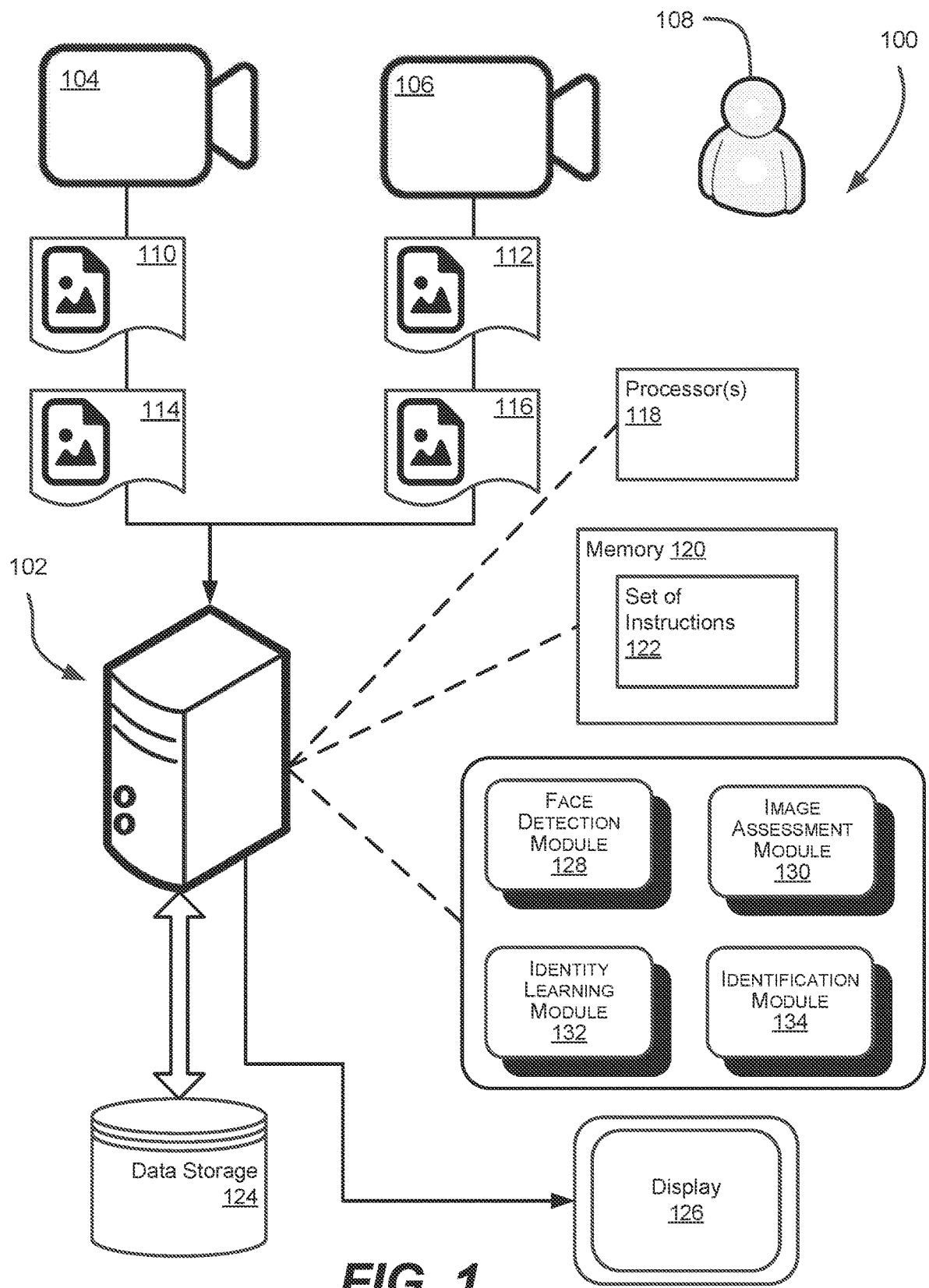
FIG. 1 shows an environment in which liveness of a subject is assessed by a system according to one or more embodiments.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances.

References to the term "subset" (e.g., "a subset of the set of items"), as used herein, unless otherwise noted or contradicted by context, is to be construed as a nonempty collection comprising one or more members or instances of a set or plurality of members or instances. Moreover, the term "subset," as used herein, refers to a collection of one or more members or instances that are collectively smaller in number than the set or plurality of which the subset is comprised. For instance, a subset of a set of ten items will include less than ten items and at least one item.

References to the term "module," as used herein, is to be construed as a collection of hardware configured to perform a set of particular computing functions within a system. The hardware of a module may include one or more processors that are specifically hardwired to perform one or more of the set of particular computing functions. A module may include a general purpose processor and memory storing a set of instructions that, as a result of execution by the general purpose processor, causes the module to perform one or more of the set of particular computing functions.

FIG. 1 shows an environment 100 in which liveness of a subject is assessed according to one or more embodiments. The assessment of liveness may be performed in connection with an authentication process. The environment 100 includes a computer system 102 electrically communicatively coupled to a first camera 104 and a second camera 106. The system 102 may determine liveness of subject 108 in the environment 100 based on a plurality of images captured by the first camera 104 and the second camera 106. The term "liveness," as used herein, refers to the presence or absence of a live human in front a camera. The determination of liveness by the system 102 may be made in connection with an authentication process for confirming an identity of a person proffered or determining an identity of a person.

The first camera 104 and the second camera 106 may be conventional digital imaging cameras that capture images via a charge-coupled device (CCD), complementary metal-oxide semiconductor (CMOS), or other similar electronic element that converts light into imaging information. The cameras 104 and 106 are spaced apart to respectively capture images of the subject 108 from different viewpoints. The first camera 104 and the second camera 106 capture images of the subject 108 to determine liveness of the subject 108. The first camera 104 captures a first image 110 of the subject 108 in a first time period, and the second camera 106 captures a second image 112 of the subject 108 in the first time period. In some embodiments, the first camera 104 and the second camera 106 may respectively capture the first image 110 and the second image 112 at the same time. In some embodiments, there may be more than two cameras capturing images of the subject 108 from different viewpoints.

One or both of the first camera 104 and the second camera 106 may capture additional images for determining liveness of the subject 108. For instance, the first camera 104 may capture a third image 114 of the subject 108 during a second time period after the first time. The second camera 106 may capture a fourth image 116 of the subject 108 during the second time period. In some embodiments, the first camera 104 and the second camera 106 may respectively capture the third image 114 and the fourth images 116 at the same time.

The first camera 104 and the second camera 106 may each include memory for storing one or more images captured. The first camera 104 and the second camera 106 provide the images captured to the system 102. The first camera 104 and the second camera 106 may be electrically communicatively coupled to the system 102 via one or more connections. The first camera 104 and the second camera 106 may be coupled to the system 102 via one or more wired connections or via one or more wireless connections. The environment 100 may include a network (not pictured) over which the one or more images captured are sent. The network may be a local area network for communicating within a building (e.g., house), a group of adjacent buildings, a campus, etc. In some embodiments, the network may be a wide area network, such as a cellular network, a telephony network, internet service provider network, or other similar network, over which long distance communications may be sent. In some embodiments, the system 102 may control the first camera 104 and the second camera 106 to cause the cameras 104 and 106 to capture images. In some embodiments, the system 102 may receive the images captured by the first camera 104 and the second camera 106 without control by the system 102.

The system 102 also includes one or more processors 118 and memory 120 coupled to the one or more processors 118 that stores a set of instructions 122 that, as a result of execution by the one or more processors 118, cause the system to perform as described herein. The memory 120 may include volatile memory (e.g., random-access memory) and/or non-volatile memory (e.g., read-only memory) for storing data and instructions. In some embodiments, the one or more processors 118 may include a device having hardware specifically configured to perform at least some of the operations described herein. For instance, the one or more processors 118 may include application specific integrated circuits (ASICs), field programmable gate arrays (FPGAs), system-on-a-chip (SoC), or other specialized or customizable computing hardware hardwired to perform at least some of the operations described herein.

The system 102 may also include or be electrically communicatively coupled (e.g., over a network, via wired communication, via wireless communication) to data storage 124 storing biometric information. The system 102 may also include or be electrically communicatively coupled to a display 126 for providing instructions to a user for assessing liveness of the user—for example, by prompting the user to change their facial expression or face orientation from a first facial expression or first face orientation to a second facial expression or second face orientation at a given time. In some embodiments, the system 102 presents a template for the user to align certain facial features with corresponding portions of the template to assess liveness of the user.

The system 102 may also include a set of modules for performing various operations described herein. The system 102 may include a face detection module 128 for detecting one or more faces of persons depicted in an image or a plurality of images. The face detection module 128 may also provide operations for tracking a face of a person between sequential images of a plurality of images. For example, the system 102 may track a face of a particular person across sequential images in video media. In response to detecting a face image in an image obtained, the face detection module 128 may also extract the face image from the image, which may include obtaining and storing image information corresponding to the face image in memory.

The system 102 may further include an image assessment module 130 that assesses various characteristics of images captured. The image assessment module 130 may analyze a face image and generate information regarding characteristics of the face image. As one example, the image assessment module 130 may generate information regarding a size of a face in the face image. Face image size may be a total number of pixels of the face in the face image, a width and height of the face or particular portions thereof in the image (e.g., width and height of eyes, nose, mouth in pixels), or an estimate of an actual width and height of the face in the face image in (e.g., eye size, mouth size, nose size). As another example, the image assessment module 130 may generate information regarding a pose or an orientation of the face depicted in the face image. The pose or the orientation of the face may be information regarding a rotational and/or elevational state of the face in the face image. For instance, the pose or orientation may refer to a rotational state of the head about an axis extending along an axis parallel to the spine, about an axis extending between lateral sides of the head (e.g., between the ears), or about an axis extending normal to a plane positioned on or in front of the face. The information regarding a pose or orientation of the face image may include one or more values indicating angles of the head. Further, the image assessment module 130 may generate information regarding individual features of the face depicted in the face image—for instance, information regarding a state of the mouth (e.g., whether the mouth is open, whether the mouth is smiling), states of the eyes (e.g., whether the eyes are open, a gaze direction of the eyes), or information regarding accessories or items on various areas of the face (e.g., vision correction glasses, jewelry).

The system 102 may also include an identity learning module 132 that learns identities of persons depicted in a face image. In some embodiments, the identity learning module 132 causes the system 102 to store, in the data storage 124 or the memory 120, information regarding identities of persons depicted in face images. The system 102 may also include an identification module 134 that identifies person represented in a face image based on biometric signature information stored in the data storage 124. In some embodiments, the identification module 134 may perform other operations or determine other information in connection with determination of an identity. For instance, the identification module 134 may determine whether the person identified is permitted to access a secure or restricted area.

The face detection module 128, the image assessment module 130, the identity learning module 132, and the identification module 134 are described as being distinct modules. In some embodiments, two or more of the modules may be combined into a single module that performs the corresponding operations for the respective modules without departing from the scope of the instant disclosure. Some or all of the face detection module 128, the image assessment module 130, the identity learning module 132, and the identification module 134 may operate according to machine learning principles by, for example, implementing neural network models or artificial intelligence models to perform their respective operations. As one example, the identity learning module 132 may be generated or trained via supervised or unsupervised learning principles to generate biometric signatures of a face. As another example, the identification module 134 may be generated or trained via supervised or unsupervised learning principles to identify a person in a face image based on a comparison of biometric signatures.

Figure 2:
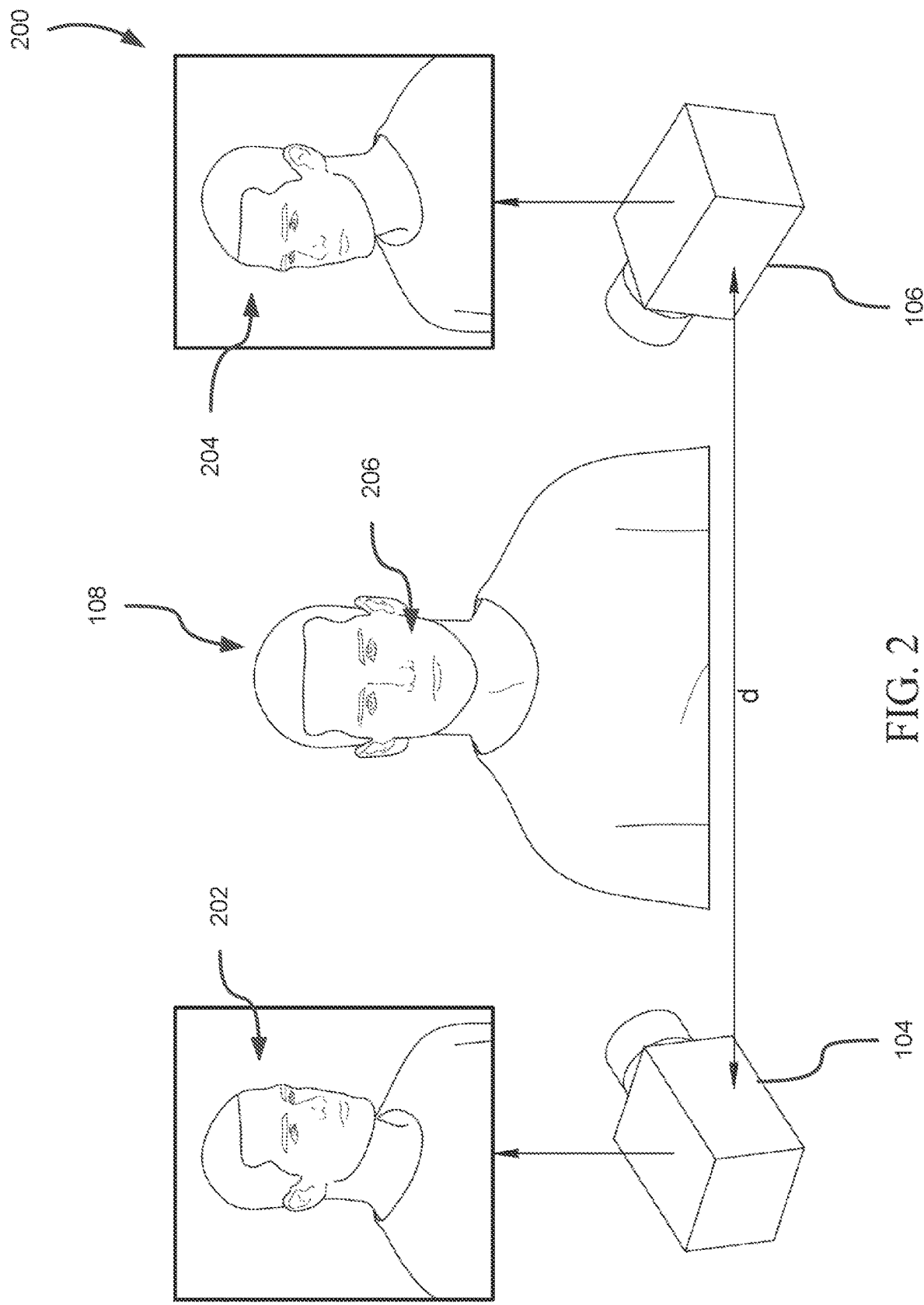
FIG. 2 shows an environment in which images captured of the subject during a first time period are obtained by the system of FIG. 1.

FIG. 2 shows an environment 200 in which images captured of a subject during a first time period are obtained by the system 102 according to one or more embodiments. The environment 200 includes the first camera 104 and the second camera 106 spaced apart from each other at a distance d. The distance d may be a distance appropriate to perceive different views of the subject 108—for instance, the distance d may be in the range of one or more centimeters (e.g., 1 cm, 3 cm), in the range of one or more feet (e.g., 1 ft, 1 m, 3 m), or a greater distance based on the optical characteristics of the cameras. The first camera 104 and the second camera 106 may be included in the same housing or physically coupled together. In some embodiments, the first camera 104 and the second camera 106 may be cameras of a smartphone, tablet, or other similar device. In some embodiments, the first camera 104 and the second camera 106 may be devices included in separate housings or located in separate compartments—for instance, the first camera 104 may be located in a first housing attached to a first side of a doorframe and the second camera 106 may be located in a second housing attached to a second side of the doorframe.

The first camera 104 may be positioned and oriented to have a field of view that intersects with a field of view of the second camera 106. In the environment 200, the first camera 104 captures a first face image 202 of the subject 108 and the second camera captures a second face image 204 of the subject 108 during a first time period. The first face image 202 may correspond to or be included in the first image 110 of the environment 100 and the second face image 204 may correspond to or be included in the second image 112 of the environment 100. The first face image 202 and the second face image 204 may be sent or otherwise provided to the system 102 for processing. In some embodiments, the first time period is a period less than a second. For instance, the first time period may be a tenth of a second or less. In general, the first time period is one in which a position and orientation of the subject 108 will likely be the same at the beginning and end of the first time period.

The first face image 202 and the second face image 204 may depict the face of the subject 108 with a first expression. For instance, the subject 108 has a neutral facial expression in the environment 200 during the first time period. The system 102 may provide instructions to the subject 108 instructing the subject 108 to assume a particular position in the environment 200 and to assume a particular facial expression or face orientation. The system 102 may instruct the subject 108 via visual instructions on the display 126 and/or via audio instructions presented on one or more audio output devices (not pictured). The system 102 may be configured to detect when images received from the first camera 104 and the second camera 106 satisfy a set of criteria regarding a facial appearance attribute of the subject 108 including at least one of the position, orientation, and/or facial expression of a face of the subject 108. As one example, the system 102 may detect when the first face image 202 and the second face image 204 have particular facial features of the subject 108 located in certain areas of the respective images. The set of criteria may include a criterion for capturing the face of the subject 108 with a first facial expression 206. In some embodiments, the set of criteria may include criteria regarding a face orientation or face position of the face of the subject 108.

Figure 3:
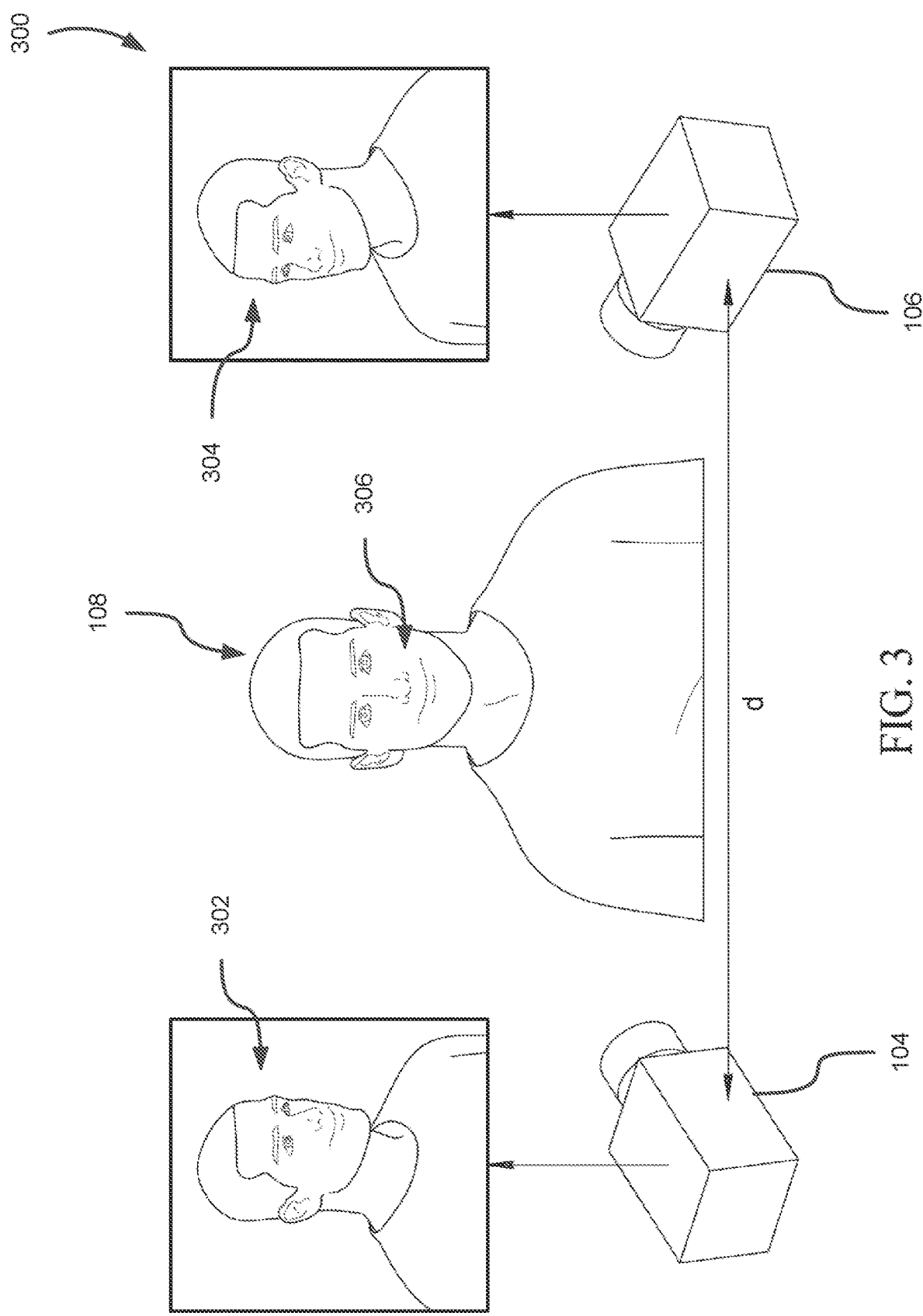
FIG. 3 shows an environment in which images captured of the subject during a second time period are obtained by the system of FIG. 1.

FIG. 3 shows an environment 300 in which images captured of a subject during a second time period after the first time period of the environment 200 are obtained by the system 102 according to one or more embodiments. The environment 300 includes the first camera 104 and the second camera 106 spaced apart from each other at the distance d. The first camera 104 and the second camera 106 have the same position and orientation as in the environment 200. In the environment 300, the first camera 104 captures a third face image 302 of the subject 108 and the second camera captures a fourth face image 304 of the subject 108 during the second time period. The third face image 302 may correspond to or be included in the third image 114 of the environment 100 and the fourth face image 304 may correspond to or be included in the fourth image 116 of the environment 100. The third face image 302 and the fourth face image 304 may be sent or otherwise provided to the system 102 for processing.

The third face image 302 and the fourth face image 304 may depict the face of the subject 108 with a second expression different than the first expression captured by the first camera 104 and the second camera 106 in connection with the environment 100. For instance, the subject 108 has a positive facial expression (e.g., smile) in the environment 300 during the first time period. The system 102 may provide instructions to the subject 108 instructing the subject 108 to assume a particular position in the environment 300 and to assume a particular facial expression or face orientation, as described above with respect to the environment 200. The system 102 may be configured to detect when images received from the first camera 104 and the second camera 106 satisfy a second set of criteria regarding the position, orientation, and/or facial expression of the subject 108. The second set of criteria may include a criterion for capturing a second facial expression 306 that is different than the first facial expression 206. The second set of criteria may include criteria regarding a facial appearance attribute including at least one of a face orientation, facial expression, or face position of the face of the subject 108. The system 102, for instance, may detect when the third face image 302 and the fourth face image 304 have particular facial features of the subject 108 located in certain areas of the respective images. The set of criteria may include a criterion for capturing the face of the subject 108 with the second facial expression 306.

Figure 4:
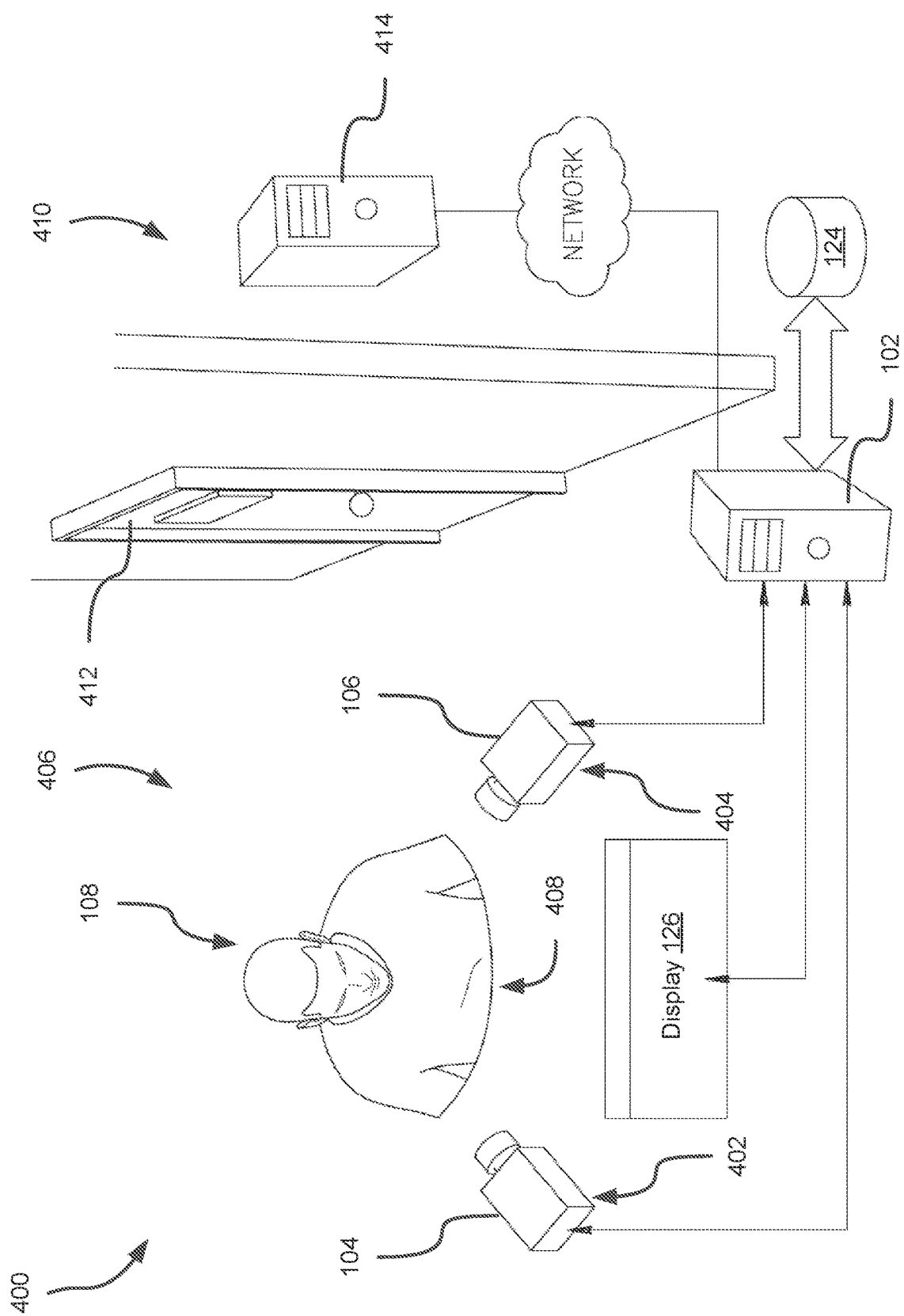
FIG. 4 shows an environment in which images of the subject are obtained by the system of FIG. 1.

FIG. 4 shows an environment 400 in which images of the subject 108 are obtained by the system 102 according to one or more embodiments. In the environment 400, the system 102 may obtain the first image 110, the second image 112, the third image 114, and/or the fourth image 116. The first image 110 and the second image 112 may be captured during the first time period discussed with respect to the environments 100 and 200. The third image 114 and the fourth image 116 may be captured during the second time period discussed with respect to the environments 100 and 300. The first camera 104 has a first position and orientation 402 and the second camera 106 has a second position and orientation 404 in the environment 400. The first position and orientation 402 shown in FIG. 4 is one in which the first camera 104 is positioned and oriented to capture the first face image 202 and/or the third face image 302 depicting a right side perspective view of the face of the subject 108. The second position and orientation 404 shown in FIG. 4 is one in which the second camera 106 is positioned and oriented to capture the second face image 204 and/or the fourth face image 304 depicting a left side perspective view of the face of the subject 108. Other positions and orientations are contemplated as being included in the scope of the present disclosure. Furthermore, the environment 400 may include three or more cameras having different positions and orientations than those depicted.

The first camera 104 and the second camera 106 may be located in a first area 406 of the environment 400. The first area 406 may be a public area or a restricted area for which the subject 108 is authorized to access. The subject 108 may position his or herself at a first location 408 in the first area 406 and in front of the first camera 104 and the second camera 106. The subject 108 may present themselves to the first camera 104 and the second camera 106 to gain access to a secure area 410 that is separated from the first area 406 by a selectively unlockable door 412. The door 412 may be selectively unlockable or opened by the system 102 or a second system 414 separate from the system 102. The system 102, for example, may provide access to the secure area 410 as a result of performing an authentication process in which the identity of the subject 108 is verified or determined and that the identity is associated with access rights to the secure area 410. The system 102, in connection with the authentication process, may verify the liveness of the subject 108—that is, that the images captured of the subject 108 are of a live human who is present before the first camera 104 and the second camera 106. In some embodiments, the subject 108 may present themselves to gain access to a computing device, operating system, application, or virtual environment instead of a physical area.

The display 126 may be located in the first area 406 and the system 102 may cause the display to present instructions to the subject 108 for positioning the head and face of the subject 108 in a certain location and orientation for the first camera 104 and the second camera 106 to capture face images. In some embodiments, the system 102 may provide feedback to the subject 108 causing the display 126 to present an image of the subject's 108 face or head relative to a correct position and orientation. For instance, the system 102 may cause the display 126 to present a template including indicators showing a correct position of the eyes, nose, and/or mouth of the subject 108 relative to the current position of the eyes, nose, and/or mouth of the subject 108 as captured by the first camera 104 or the second camera 106.

The system 102 may obtain the first image 110, the second image 112, the third image 114, and/or the fourth image 116 and process the images obtained to determine a liveness of the subject 108. That is, the system 102 may process images obtained by the first camera 104 and the second camera 106 to determine whether the subject 108 is a live human that is present in front of the first camera 104 and the second camera 106. In connection or as a result of verifying the liveness of the subject 108, the system 102 may perform an authentication process to determine or verify the identity of the subject 108.

The system 102 may verify liveness of the subject 108 by comparing pairs of face images of the images obtained. The system 102 may compare a first pair of images captured during the same time period as one aspect of verifying liveness. As one example, the system 102 may compare the first face image 202 with the second face image 204 to determine whether the first face image 202 and the second face image 204 are consistent with each other. The system 102 may also compare a second pair of images respectively captured during sequential time periods as another aspect of verifying liveness. The system may compare the first face image 202 with the third face image 302 to determine whether there is a variance in a facial appearance attribute including at least one of a facial expression, face orientation, or face position between the first face image 202 and the third face image 302. Other pairs of images may be compared as part of the liveness verification, as described elsewhere herein.

The first camera 104 and the second camera 106 may be positioned and oriented relative to the intersection of their fields of view to capture different views of the face of the subject 108. In the environment 400, for example, the first camera 104 is positioned and oriented to capture a right side perspective view of the face of the subject 108 and the second camera 106 is positioned and oriented to capture a left side perspective view of the face of the subject 108. However, the first camera 104 and/or the second camera 106 may be positioned and oriented to capture other views in some embodiments.

Figure 5:
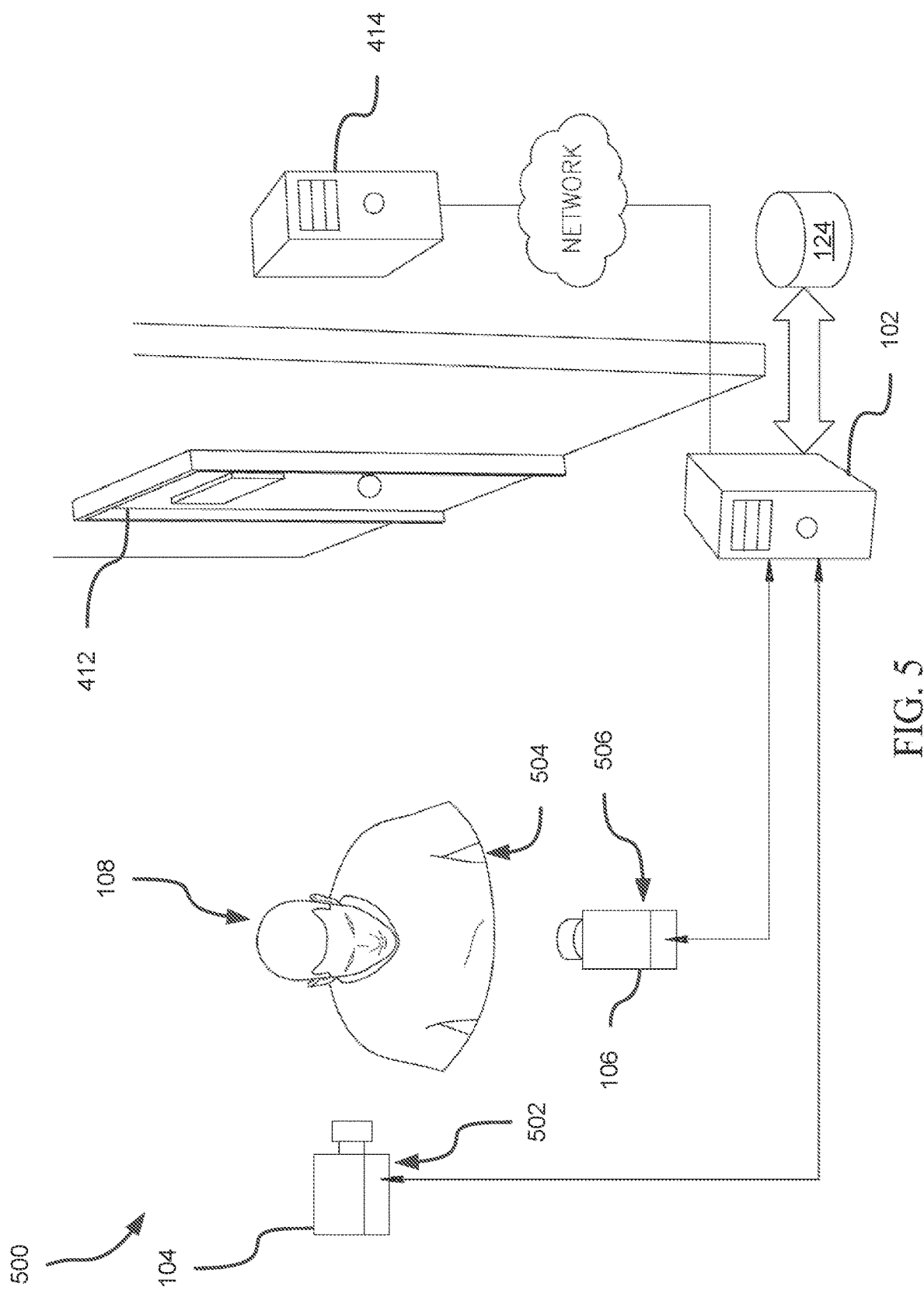
FIG. 5 shows an environment in which one or more images of the subject are obtained by the system of FIG. 1.

FIG. 5 shows an environment 500 in which images of the subject 108 are obtained by the system 102 according to one or more embodiments. The environment 500 is the same as the environment 400 with the exception of the position and orientation of the first camera 104 and the second camera 106 relative to a location. In particular, the first camera 104 has a third position and orientation 502 relative to a second location 504 at which the subject 108 is located. The second camera 106 has a fourth position and orientation 506 relative to the second location 504. The second location 504 may be the same as the first location 408 in some embodiments, but may be different in other embodiments. The third position and orientation 502 is one in which the first camera 104 is positioned and oriented to obtain an image depicting a profile view of the face of the subject 108. The fourth position and orientation 506 is one in which the second camera 106 is positioned and oriented to obtain an image depicting a front view of the face of the subject 108.

The environment 400 and/or 500 may include additional cameras. For instance, the environment 500 may include a camera having an orientation and positon to capture an image depicting a second profile view of the face of the subject 108 from a side opposite to the third location and position 502. The environment 500 may include a camera having the first position and orientation 402 and/or a camera having the second position and orientation 404.

In some embodiments, the first camera 104 and the second camera 106 may be positioned at the same height. In some embodiments, a height of the first camera 104 and the second camera 106 may be adjusted, e.g., by the system 102, to capture an appropriate view of the subject 108. In some embodiments, the first camera 104 and/or the second camera 106 may be attached to a wall, a ceiling, or a floor to capture a particular view.

Figure 6:
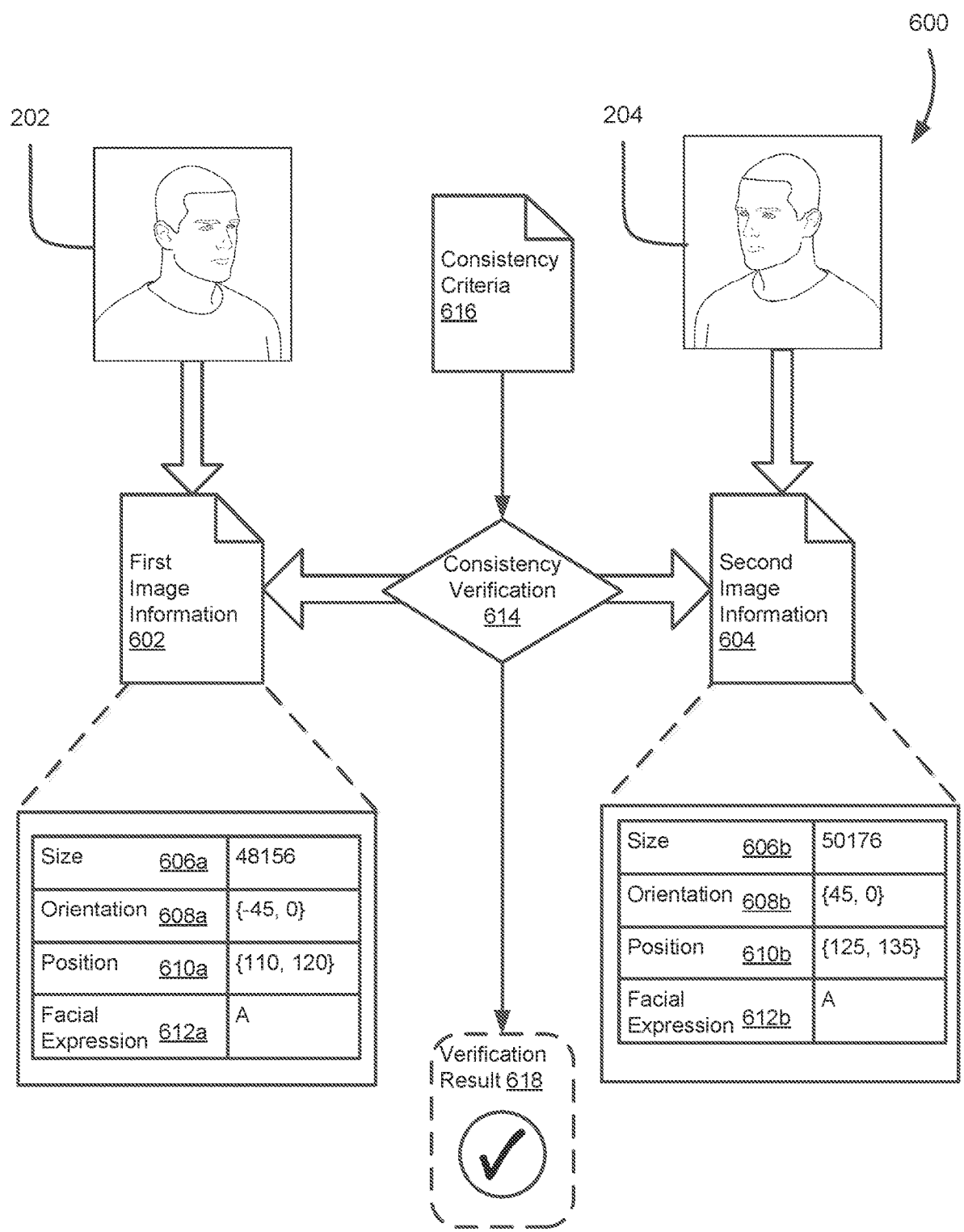
FIG. 6 shows a diagram of a process in which pairs of face images captured in the same time period are assessed.

FIG. 6 shows a diagram of a process 600 in which consistency is evaluated for pairs of face images captured in the same period of time for the same subject. The process 600 may be performed by the system 102 in connection with obtaining the first image 110 and the second image 112 that were captured during the first time period. The first face image 202 and the second face image 204 may be extracted from the first image 110 and the second image 112. The system 102 generates first image information 602 regarding the first face image 202 and second image information 604 regarding the second face image 204. The first image information 602 and the second image information 604 may include information regarding a set of factors for the corresponding face image depicted therein. The set of factors may include one or more of size, orientation, position, and facial expression. The first image information 602 and the second image information 604 may be generated by the image assessment module 130 and stored in the memory 120.

The image information may include size information 606 regarding a size of a face in the respective face image, orientation information 608 regarding an orientation of a face depicted in the respective face image, position information 610 regarding a position of the face, and facial expression information 612 regarding a facial expression of the face in the respective face image. The size information 606, the orientation information 608, the position information 610, and the facial expression information 612 may respectively include or have associated therewith an alphanumeric value representative of various characteristics of the respective face image. The image information may be formatted as an array, such as a one-dimensional array in which the alphanumeric entries are separated by delimiters (e.g., semi-colon, comma, tab). The image information may be formatted as a multi-dimensional array or table having multiple columns and rows. In some embodiments, the information determined or generated for each face image in connection with the process 600 may not include all of the information described and depicted with respect to FIG. 6. For example, the first image information 602 and the second image information 604 may not include the facial expression information 612.

The size information 606 may include one or more alphanumeric values representative of a total number of pixels of the face in the face image, a width and height of the face or particular portions thereof in the image (e.g., width and height of eyes, nose, mouth in pixels), or an estimate of an actual width and height of the face in the face image in (e.g., eye size, mouth size, nose size). For example, the size information 606a for the first image information 602 indicates that the face depicted in the first face image 202 has 48156 pixels.

The orientation information 608 may include one or more alphanumeric values indicating an orientation of the face relative to an optical axis of the camera capturing the face image. The orientation information 608 may be generated based on the features identified in the person's face and head in the face image. For instance, if the top of a person's head and a right eye of the subject are visible in the face image, the orientation information 608 may indicate that the head is oriented downward and to the left of the optical axis of the camera capturing the face image. The orientation information 608 may have a format indicating rotation about one or more axes. The orientation information 608a shown for the first face image 202 indicates that the head depicted in the first face image 202 is rotated −10° about a vertical axis and 0° about a horizontal axis. In some embodiments, the orientation information 608 may include alphanumeric values representative of various features that can be identified in the face image, which may correspond to rotational states of the head shown in the face image.

The position information 610 may include one or more alphanumeric values indicating a position of the face image in the environment or the image. In some embodiments, the position information 610 may be generated based on a position of the face image. The system 102 may, with respect to the first face image 202 for example, determine a centroid of the first face image 202 and then determine a position of the centroid within the first image 110. In some embodiments, the system 102 may generate the position information 610 by estimating a position of the face or head of the subject 108 in Euclidean space. The position information 610 may be formatted as a set of Cartesian coordinates or may be formatted according to another appropriate coordinate system. The position information 610a for the first face image 202 indicates that the centroid of the face is located at coordinates {110, 120} in the first image 110.

The facial expression information 612 may include alphanumeric values representative of a facial expression of the face depicted in the respective face image. The system 102 may detect various facial features, such as the mouth and eyes, and determine a state of one or more of the facial features. For instance, the person depicted in the first face image 202 may be determined as having a neutral facial expression based on a shape of the mouth and orientation of the eyebrows. The system 102 may determine alphanumeric values for each feature evaluated or generate an alphanumeric value based on an overall assessment of the state of the facial features. The facial expression information 612a for the first face image 202 has an alphanumeric value 'A' corresponding to the neutral facial expression.

The system 102 performs consistency verification 614 to determine whether the first face image 202 and the second face image 204 are consistent with each other. A determination that the first face image 202 and the second face image 204 are consistent helps to prevent spoofing an identity by ensuring that the subject 108 presented is verifiable as being present from two or more views and that the views are consistent with each other according to the set of factors. The consistency verification 614 may evaluate that the size, position, orientation, and/or facial expression are consistent between the first face image 202 and the second face image 204. The consistency verification 614 may include a comparison between corresponding information of the first image information 602 and the second image information 604. For example, the system 102 may compare of the size information 606a of the first image information 602 with size information 606b of the second image information 604, the orientation information 608a of the first image information 602 with orientation information 608b of the second image information 604, the position information 610a of the first image information 602 with position information 610b of the second image information 604, and the facial expression information 612a of the first image information 602 with facial expression information 612b of the second image information 604. The comparison may include determining differences between each respective component of information.

The system 102 may then evaluate consistency between the first image information 602 and the second image information 604 based on a set of consistency criteria 616. The consistency criteria 616 may specify conditions or thresholds for one or more of the set of factors. The system 102 evaluates the consistency between the first image information 602 and the second image information 604 and determines whether there are similarities or differences that satisfy the conditions or thresholds specified in the consistency criteria 616. The consistency verification 614 may include evaluating, for individual factors of the set of factors, corresponding information in between the first face image 202 and the second face image 204.

As one example, the system 102 may determine whether there is a match between the orientation information 608a of the first image information 602 and the orientation information 608b of the second image information 604. A match between the information may be determined as result of a correspondence in values for the orientation information 608a and 608b satisfies a criterion for orientation specified in the consistency criteria 616. The match may be determined on the basis that a difference between the orientation information 608a and the orientation information 608b is within an acceptable range specified in the consistency criteria 616. The criterion for orientation may specify that the difference between the orientation for the first face image 202 and the second face image 204 is within a certain range. As a result of the first camera 104 and the second camera 106 having optical axes oriented at about 90° to each other, the consistency criteria 616 may specify that the difference between the orientation information 608a and the orientation information 608b is between 95° and 85° for a first axis of rotation. As another example, the consistency criteria 616 may specify that the facial expression information 612 is similar or the same for the first image information 602 and the second image information 604.

The system 102 may generate a verification result 618 indicating a result of the consistency verification 614. The verification result 618 indicates whether the first face image 202 and the second face image 204 are consistent with each other. The verification result 618 may indicate that the first face image 202 and the second face image 204 are consistent with each other as a result of verifying that consistency between the first image information 602 and the second image information 604 satisfy all or some of the consistency criteria 616. On the other hand, the verification result 618 may indicate that the first face image 202 and the second face image 204 are inconsistent with each other as a result of verifying that differences between the first image information 602 and the second image information 604 fail to satisfy the consistency criteria 616. The system 102 makes a determination of liveness of the subject 108 based on the verification result 618 for the first face image 202 and the second face image 204.

The process 600 may be performed in connection with the system 102 providing instructions to the subject 108 to position their face in a particular area and make a certain facial expression. The system 102 may, for instance, instruct the subject 108, e.g., via the display 126, to position their face such that their facial features are depicted as being within corresponding regions of a template on the display 126. The system 102 may also instruct the subject 108 to maintain a certain facial expression or look at a certain location in the environment.

The process 600 may be repeated for each pair of face images that are captured in the same period of time. The system 102 may perform the consistency verification 614 for the third face image 302 and the fourth face image 304. The consistency criteria 616 may be generated as a result of a calibration process in which one or more known live persons are presented to the system 102 and the system 102 learns the three-dimensional space in which the first camera 104 and the second camera 106 are located and learns where the subject 108 will be presented. The calibration process may include generating a set of values for parameters of a set of equations that are representative of the position and orientation of the first camera 104, the position and orientation of the second camera 106, and a location where the subject 108 is to be presented relative to the position and orientation of the first camera 104 and the second camera 106.

The calibration process may be performed according to machine learning principles by, for example, implementing neural network models or artificial intelligence models to perform their respective operations. As a particular example, the image assessment module 130 may be generated or trained via supervised or unsupervised learning principles to generate parameters and/or equations that appropriately model the relationships between the first camera 104, the second camera 106, and the location of the subject relative to the environment.

Figure 7:
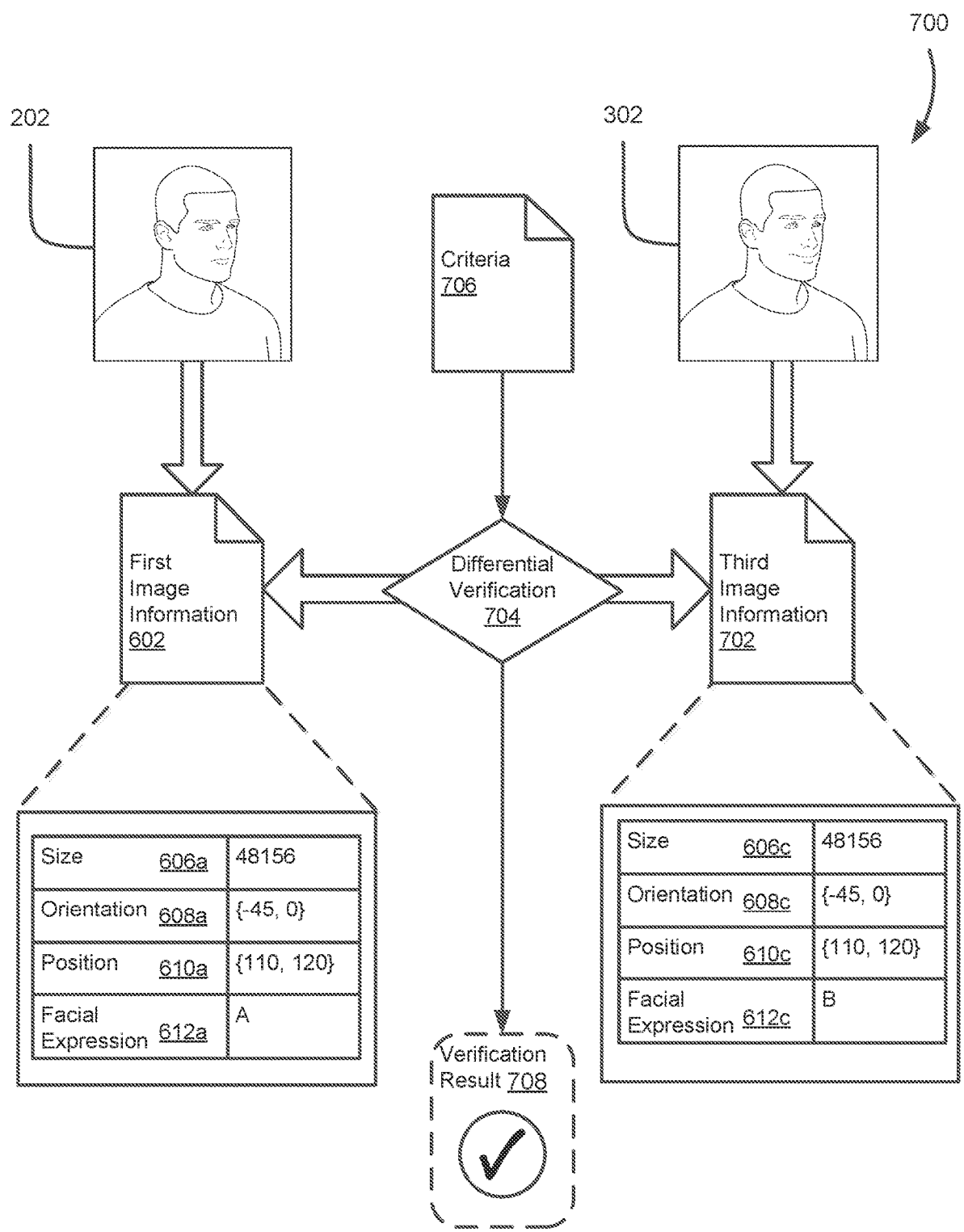
FIG. 7 shows a diagram of a process in which pairs of face images captured in different time periods are assessed.

FIG. 7 shows a diagram of a process 700 in which image information is assessed to detect the presence of a variance between pairs of face images captured in different periods of time for the same subject. The process 700 may be performed as part of assessing liveness of the subject 108 presented and may be performed in connection with obtaining the third image 114 and/or the fourth image 116 that were captured in the second time period after the first time period. The pair of images compared in the process 700 are face images captured by the same camera at different times. In FIG. 7, the pair of images compared (i.e., the first face image 202 and the third face image 302) are captured by the first camera 104 during the first time period and the second time period. However, other iterations of the process 700 may include evaluating a difference between the second face image 204 and the fourth face image 304 in connection with evaluation of liveness of the subject 108.

In some embodiments, the process 700 may be performed subsequent to performing the process 600 to verify consistency between a pair of images, such as a verification of the consistency of the first face image 202 and the second face image 204. In some embodiments, the process 700 may be performed as a result of or subsequent to verifying that the third face image 302 and the fourth face image 304 are consistent with each other according to the process 600.

The third face image 302 may be extracted from the third image 114. In some embodiments, the fourth face image 304 may be extracted from the fourth image 116. In the process 700, the system 102 may generate third image information 702 regarding the third face image 302. The third image information 702 may include information regarding some or all of the factors described above. In some embodiments, the third image information 702 includes the facial expression information 612 regarding a facial expression of the face depicted in the third face image 302. The third image information 702, in some embodiments, may include the size information 606, the orientation information 608, and/or the position information 610. The system 102 may also obtain the first image information 602 from the memory 120 for evaluating differences between the pair of images.

The system 102 performs a differential verification 704 to determine whether there is a variance between the first face image 202 and the third face image 302 that indicates the liveness of the subject 108 presented. The differential verification 704 may verify the presence or absence of a particular variance in one or more factors between the first face image 202 and the third face image 302. A determination of the presence of variance for the one or more factors between the pair of images helps to prevent spoofing of an identity by ensuring that the subject presented is verifiable as being mobile or otherwise dynamic, helping to demonstrate that the subject 108 is live and present in front of the first camera 104 and the second camera 106. The differential verification 704 may evaluate whether there is a variance between one or more of the size, position, orientation, and/or facial expression of the first face image 202 and the third face image 302. The differential verification 704 may include a comparison between corresponding information of the first image information 602 and the third image information 702. The system 102 may perform a piecewise comparison of one or more of the size information 606, the orientation information 608, the position information 610, and the facial expression information 612 for the first image information 602 and the third image information 702. In some embodiments, the comparison may particularly determine a difference between the facial expression information 612 for the first image information 602 and the facial expression information 612 for the third image information 702.

The system 102 may then evaluate a difference between the first image information 602 and the third image information 702 based on a set of criteria 706. The set of criteria 706 may specify conditions or thresholds for one or more of the set of factors. The system 102 evaluates the differences between the first image information 602 and the third image information 702 and determines whether there are differences that satisfy the conditions or thresholds specified in the criteria 706. The differential verification 704 may include evaluating, for an individual factor, a particular difference between the first face image 202 and the second face image 204.

In the process 700, the criteria 706 may specify a criterion regarding a difference in facial expressions between the first face image 202 and the third face image 302. The criteria 706 may indicate that the facial expression information 612c for the third image information 702 is different than the facial expression information 612a for the first image information 602. The criteria 706 may further specify that the facial expression information 612a corresponds to a first particular facial expression (e.g., neutral facial expression) and that the facial expression information 612c corresponds to a second particular facial expression (e.g., a smile). In FIG. 7, the criteria 706 may specify that the facial expression information 612a for the first image information 602 is a facial expression 'A' and that the facial expression information 612c for the third image information 702 is a facial expression 'B'. According to the facial expression information 612 shown, the system 102 would therefore determine that a variance is present between the first face image 202 and the third face image 302.

The variance to be detected or evaluated may be based on an instruction provided by the system 102 to the subject 108 in connection with capturing images during the second time period. The system 102 may instruct the subject 108 to smile and then modify the criteria 706 to specify that the facial expression information 612c for the third image information 702 should correspond to the instructed facial instruction. The system 102 may determine that the third image information 702 does not satisfy the criteria 706 if the third image information 702 does not include information indicating that the facial expression in the third face image 302 corresponds to the facial expression instructed.

The criteria 706 may further specify that the information for one or more other factors is consistent between the first image information 602 and the third image information 702. For instance, the criteria 706 may specify a condition regarding consistency or similarity between the orientation information 608a for the first image information 602 and the orientation information 608c for the third image information 702. The condition regarding similarity may be the same as a condition specified in the consistency criteria 616 or may be a different condition. In some embodiments, the criteria 706 may require that the information for all of the factors other than the facial expression is consistent between the first image information 602 and the third image information 702.

The system 102 may generate a verification result 708 indicating a result of the differential verification 704. The verification result 708 indicates whether a variance is detected between the first face image 202 and the third face image 302 that satisfies the criteria 706. The verification result 708 may positively indicate that the third face image 302 satisfies the differential verification 704 in view of the first face image 202 as a result of the third image information 702 satisfying the criteria 706. The verification result 708 may indicate that the third face image 302 fails the differential verification 704 as a result of failing to detect the variance specified in the criteria 706. In some embodiments, the verification result 708 may indicate that the third face image 302 fails the differential verification 704 as a result of failing to satisfy one or more other conditions in the criteria 706, such as consistency between information for the factors other than the facial expression.

The system 102 makes a determination of liveness of the subject 108 based on the verification result 708 for the first face image 202 and the third face image 302. The process 700 may be repeated for each pair of face images that are captured in sequential periods of time. The system 102 may perform the differential verification 704 for the second face image 204 and the fourth face image 304. The differential verification 704 may be generated as a result of the calibration process described herein.

The system 102 may perform an authentication process for the subject 108 presented as a result of positively verifying the liveness of the subject 108—that is, determining that the subject 108 is a live human present in front of the first camera 104 and the second camera 106. Positively verifying the liveness of the subject 108 is based on the verification result 618 indicating satisfaction of the consistency verification 614 for the pairs of face images evaluated and the verification result 708 indicating satisfaction of the differential verification 704 for the pairs of face images evaluated.

Performing the processes 600 and 700 verifies the liveness of the subject 108 presented using standard digital cameras without the need for specialized equipment, such as three-dimensional cameras. The processes 600 and 700 are performed in connection with each other to verify that face images of the subject 108 for the same time periods are consistent for a set of factors and that face images of the subject 108 for different or sequential time periods vary in one or more particular respects. Verifying the liveness of the subject 108 according to the processes 600 and 700 helps to guard against spoofing the identity of the subject 108. The accuracy and robustness of an authentication system can therefore be improved according to the systems and methods described herein.

Figure 8:
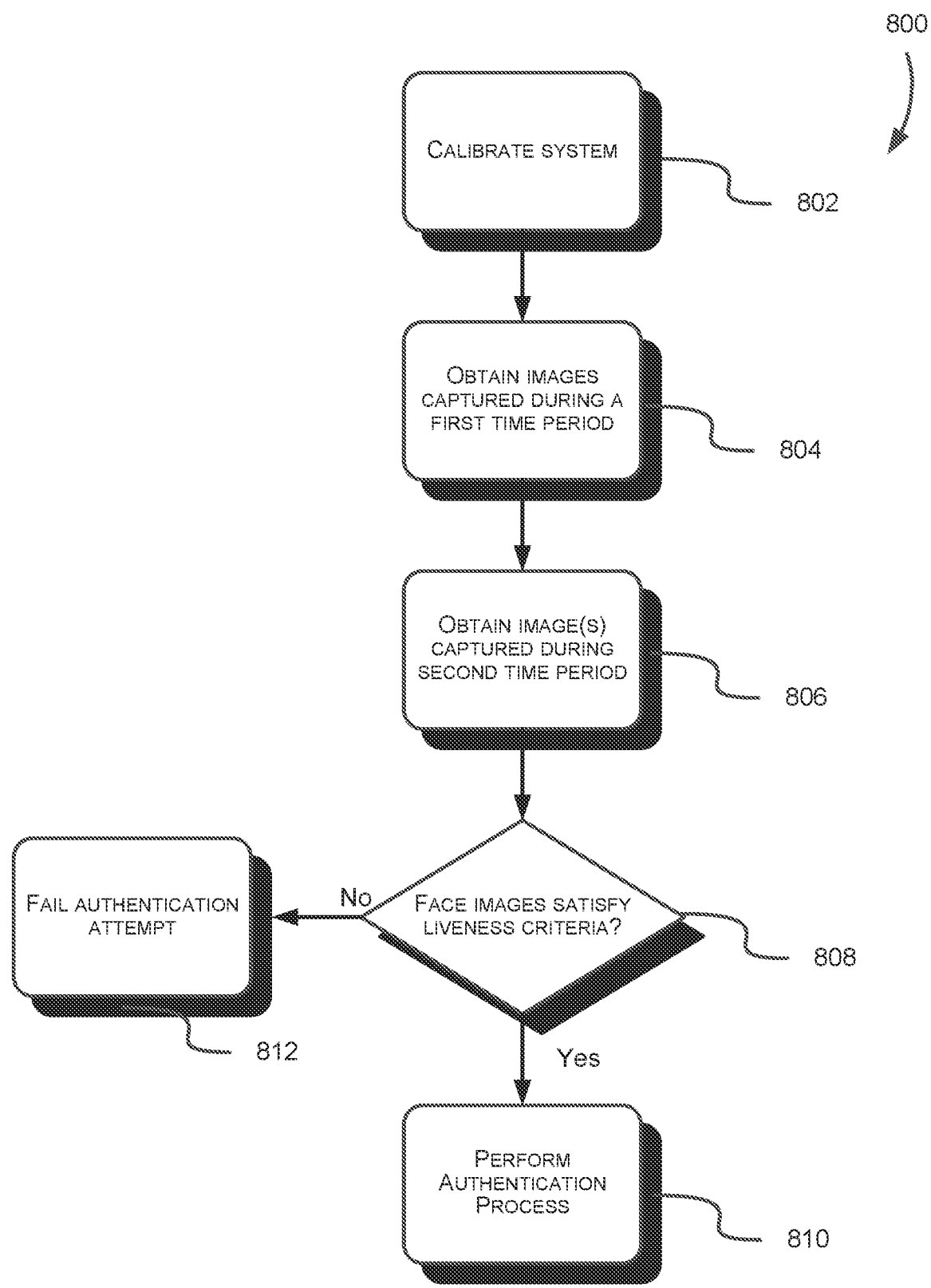
FIG. 8 shows a method for assessing liveness of the subject according to one or more embodiments.

FIG. 8 shows a method 800 for verifying liveness of the subject 108 presented to the first camera 104 and the second camera 106 according to one or more embodiments. The method 800 is performed at least in part by the system 102. The method 800 may be performed in connection with or as a prerequisite to the authentication process described herein. The method 800 includes calibrating 802 the system 102. Calibrating the system 102 may be performed after the first camera 104 and the second camera 106 are respectively positioned and oriented to capture face images. Calibrating 802 may include presenting faces of one or more known live persons to the first camera 104 and the second camera 106 and capturing face images of the known live persons for processing by the system 102. Calibrating 802 causes the system 102 to learn the three-dimensional space in which the first camera 104 and the second camera 106 are located and learns where the subject 108 will be presented. In connection with the calibration process, the system 102 generates a set of values for parameters of a set of equations that are representative of the position and orientation of the first camera 104, the position and orientation of the second camera 106, and a location where the subject 108 is to be presented relative to the position and orientation of the first camera 104 and the second camera 106.

The method 800 also includes obtaining 804 images captured during a first time period. Obtaining 804, for example, may include obtaining the first image 110 and the second image 112 respectively captured by the first camera 104 and the second camera 106 during the first time period, as described with respect to FIGS. 1 and 2 and elsewhere herein. Obtaining 804 the images captured during the first time period may include detecting, extracting, or otherwise acquiring face images from the images captured, such as obtaining the first face image 202 and the second face image 204 respectively from the first image 110 and the second image 112.

The method 800 may also include obtaining 806 one or more images captured during a second time period subsequent to the first time period. Obtaining 806, as discussed herein, involves obtaining the third image 114 and/or the fourth image 116 respectively captured by the first camera 104 and the second camera 106 during the second time period, as discussed above with respect to FIGS. 1 and 3 and elsewhere herein. In some embodiments, the system 102 may obtain a single image in 806. In some embodiments, the system 102 may obtain two or more images in 806.

Next, the system determines 808 whether the images obtained in 804 and 804 include face images that satisfy criteria for liveness. The criteria for liveness includes the consistency criteria 616 and the criteria 706 discussed with respect to the processes 600 and 700 of FIGS. 6 and 7. Further description of determining 808 whether the images obtained satisfy the liveness criteria is discussed with respect to FIGS. 9 and 10 and elsewhere herein.

As a result of determining in 808 that the face images obtained satisfy the liveness criteria, the system 102 may proceed to perform 810 an authentication process. Performing 810 the authentication process may include generating a biometric signature of a face image and matching the biometric signature to a biometric signature stored in the data storage 124. Further description of authenticating a person is described in U.S. patent application Ser. No. 16/262,590, filed Jan. 30, 2019, which is incorporated herein by reference in its entirety. Performing 810 the authentication process may include causing the system 102 to interact with another system, such as the second system 414, to determine or verify the identity of a person depicted.

As a result of determining in 808 that the face images obtained fail to satisfy the liveness criteria, the system 102 may reject or fail 812 the attempt to authenticate the subject 108. The system 102, for instance, may notify the subject 108 that the authentication attempt failed and invite the subject 108 to initiate another attempt. In some embodiments, the system 102 may, as part of failing 812 the attempt, initiate a security protocol notifying an authorized entity of the failure to verify liveness, increasing standards for authentication, or locking the system 102 from further attempts.

Figure 9:
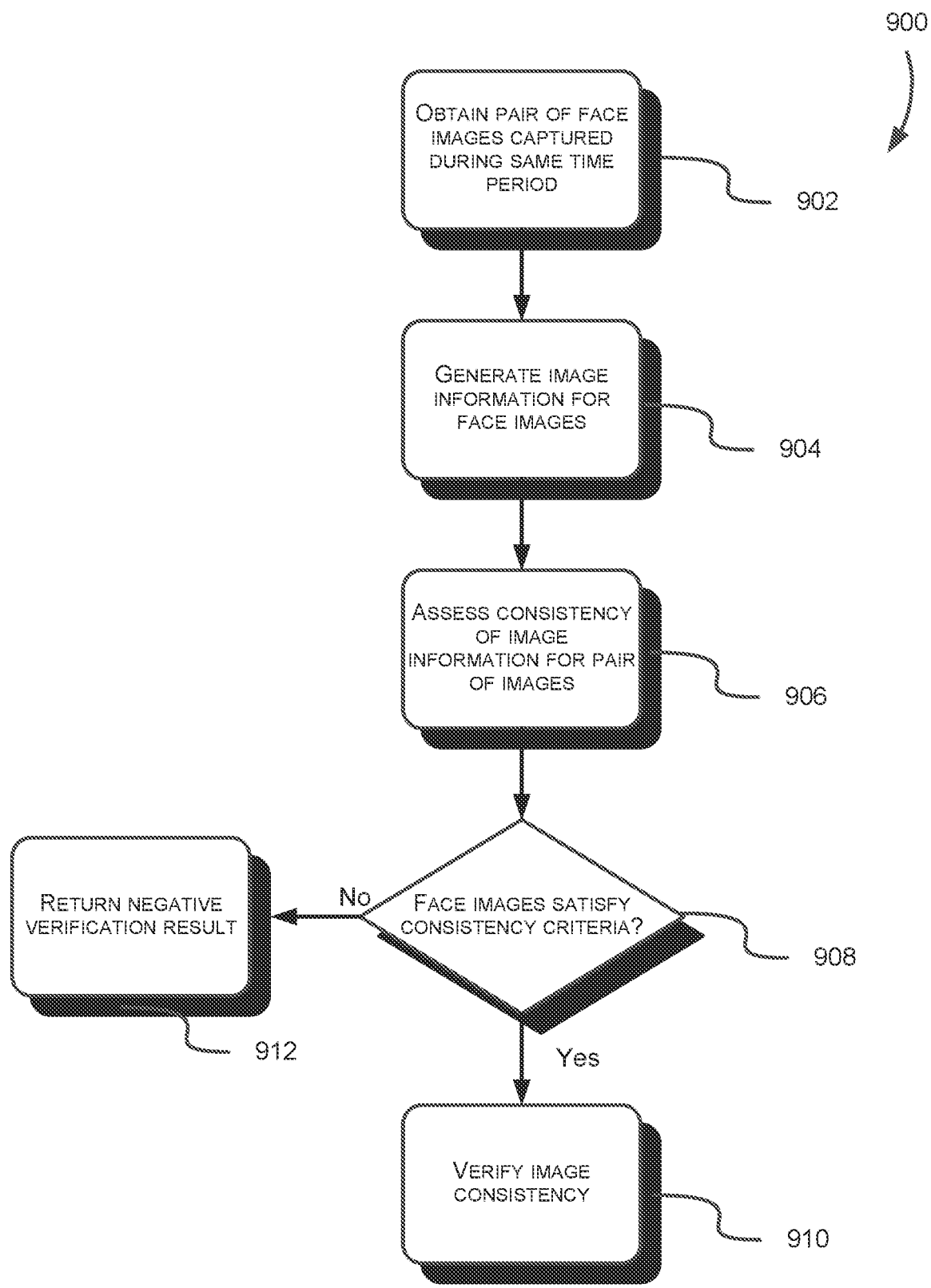
FIG. 9 shows a method for verifying the consistency of a pair of images captured during the same time period.

FIG. 9 shows a method 900 for verifying a consistency match between a pair of images captured in the same time period. The method 900 may be performed by the system 102 in connection with determining 808 whether the face images obtained satisfy the liveness criteria or the process 600 described herein with respect to FIG. 6 and elsewhere. The method 900 begins by obtaining 902 a pair of images captured during the same time period. Obtaining 902 may include obtaining the first face image 202 and the second face image 204 captured during the first time period, or obtaining the third face image 302 and the fourth face image 304 captured during the second time period.

Thereafter, the method 900 includes generating 904 image information for the images obtained in 902. Generating 904 the image information may, for instance, include generating or determining the first image information 602 and the second image information 604 respectively for the first face image 202 and the second face image 204. Generating 904 the image information may include generating the third image information 702 for the third face image 302 and fourth image information for the fourth face image 304. The image information generated in 904 may include information regarding one or more factors for the images or the face depicted therein, such as size of the face, the orientation of the face relative to the camera capturing the image or relative to another reference point, or the position of the face in the image captured or in three-dimensional space. In some embodiments, the image information generated in 904 may include information regarding a facial expression of the face depicted in the image obtained.

The method 900 further includes assessing 906 consistency of the image information for the pair of images obtained. Assessing 906 may include comparing the image information for a first face image of the pair of images to the image information for a second face image of the pair of images. For example, the system 102 may compare, for one or more of the set of factors (e.g., size, orientation, position, facial expression), the first image information 602 of the first face image 202 to corresponding information in the second image information 604 of the second face image 204. The assessment in 906 may involve comparing orientation information 608a regarding the face depicted in the first face image 202 to orientation information 608b regarding the face depicted in the second face image 204 to determine a consistency therebetween. With respect to the process 600, the system 102 may determine that a value {−45°, 0°} in the orientation information 608a is different than a value {45°, 0°} in the orientation information 608b, and may further determine a value representative of the difference—in this instance, a value of {90°, 0°}. The assessment in 906 may include determining corresponding differences in information for one or more of the other factors as well.

Then, the method 900 proceeds to determining 908 whether the face images obtained satisfy the consistency criteria 616 based on the assessment in 906. Determining 908 includes evaluating whether differences between the first image information 602 and the second image information 604 are acceptable in view of the consistency criteria 616. As described herein, the consistency criteria 616 may specify conditions, ranges, or thresholds for each of the set of factors that should be satisfied to verify consistency between the first face image 202 and the second face image 204. The consistency criteria 616 may specify a criterion for the size information 606, a criterion for the orientation information 608, a criterion for the position information 610, and/or a criterion for the facial expression information 612.

Continuing with the example provided above, the consistency criteria 616 may specify that a difference between the orientation information 608a and the orientation information 608b should be within a certain range—for example, 90°±5° for rotation about a vertical axis and 0°±5° for rotation about a horizontal axis. Accordingly, the system 102 may determine that the orientation criterion is satisfied because the difference between the orientation information 608a and 608b is 90° for rotation about the vertical axis and 0° for rotation about the horizontal axis. The system 102 may determine that the first face image 202 and the second face image 204 are consistent with each other as a result of satisfaction of the consistency criteria 616 for factors specified. The system 102 may generate the verification result 618 based on the determination in 908.

As a result of determining in 908 that the consistency criteria 616 is satisfied, the system 102 verifies 910 that the pair of images obtained in 902 are consistent. For instance, the system 102 may generate and store verification information in the memory 120 indicating that the pair of images captured during the first period of time are consistent. The verification information may be evaluated in connection with a result of the process 700 or the method 1000 described below to determine whether to authorize performance of the authentication process in 810. If the system 102 determines in 908 that the pair of images obtained in 902 fail to satisfy the consistency criteria 616, the system may return 912 a negative verification result for the consistency assessment. Returning 912 the negative verification result may cause the system 102 to fail 812 the authentication attempt. In some embodiments, the system 102 may, as a precondition for performing 810 the authentication process, generate verification information in 910 for a first pair of face images captured during the first time period (e.g., the first face image 202 and the second face image 204) and a second pair of face images captured during the second time period (e.g., the third face image 302 and the fourth face image 304).

In some embodiments, the method 900 may include verifying in 908 a consistency between biometric signatures generated for the pair of face images obtained in 902. The system 102 may, for example, generate a first biometric signature for the first face image 202 and generate a second biometric signature for the second face image 204. The system 102 may compare the first biometric signature and the second biometric signature and determine a consistency or similarity therebetween. For instance, the consistency between the biometric signatures may be a distance in Euclidean space between the first biometric signature and the second biometric signature. The distance between the biometric signatures may be an indicator of whether the identity of the person depicted in the pair of face images is the same in both. The consistency criteria 616 may include a criterion for consistency between biometric signatures for face image pairs. Generating the verification information in 910 may be as a result of determining that the consistency between the biometric signatures satisfies a criterion specified in the consistency criteria 616. Further description regarding generating biometric signatures and comparison thereof is described in U.S. patent application Ser. No. 16/262,590, filed Jan. 30, 2019, the entirety of which is incorporated by reference herein; and in U.S. Provisional Patent Application entitled "ADAPTIVE LEARNING AND MATCHING OF FACE MODALITIES" (RN463; Seed IP Ref.: 780099.435), filed Apr. 5, 2019, the entirety of which is incorporated by reference herein.

Figure 10:
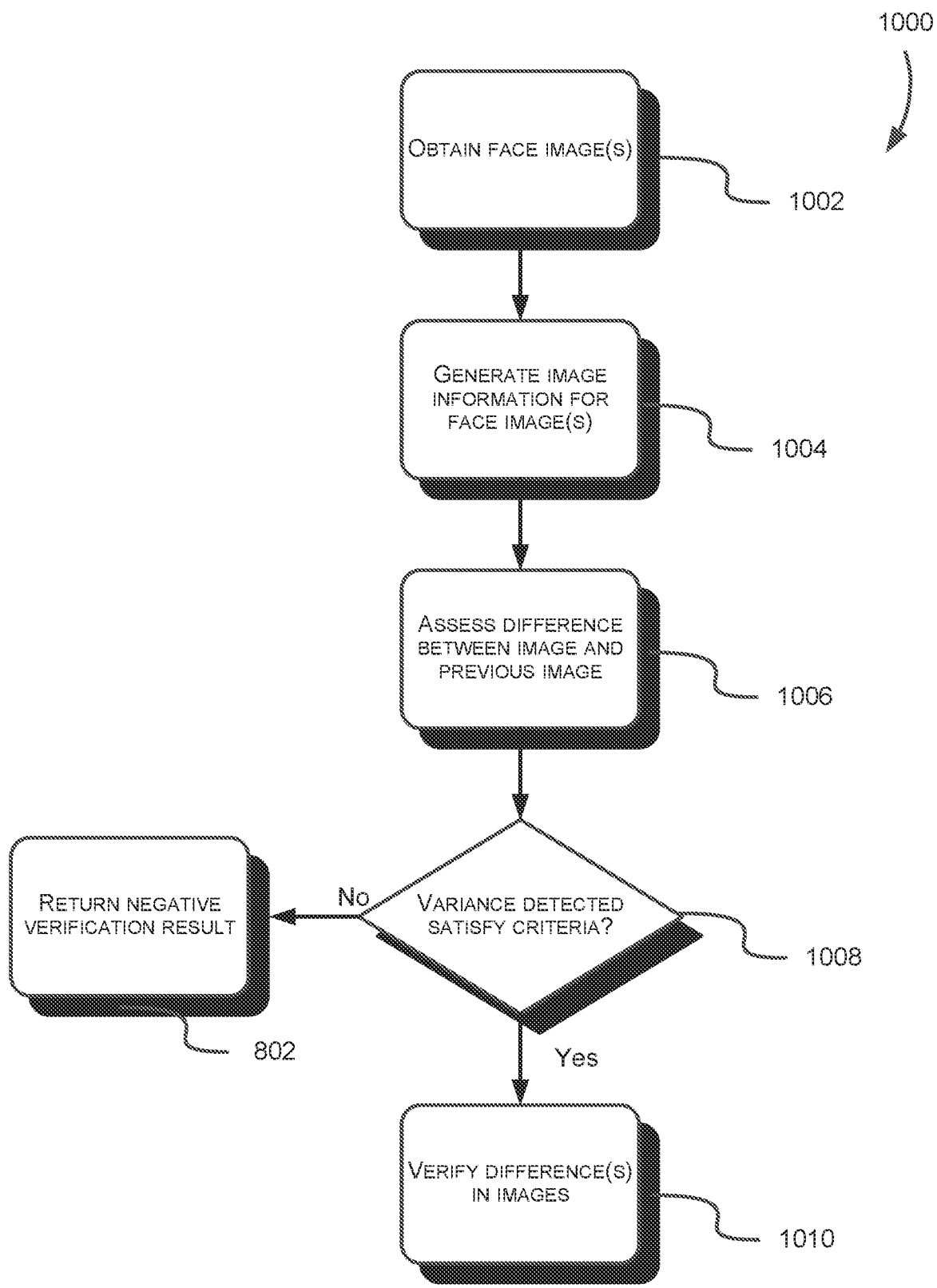
FIG. 10 shows a method for assessing variance between a pair of images captured during different time periods.

FIG. 10 shows a method 1000 for assessing a pair of images to detect the presence of a particular variance between the pair of images. The method 1000 may be performed by the system 102 in connection with determining 808 whether the face images satisfy the liveness criteria of FIG. 8 and the process 700 of FIG. 7 discussed above. The method 1000 includes obtaining 1002 one or more face images captured by the first camera 104 and/or the second camera 106 during the second time period after the first time period. As discussed with respect to FIG. 3, for example, the system 102 may obtain the third face image 302 captured by the first camera 104 during the second time period. The system 102 may alternatively obtain the fourth face image 304 captured by the second camera 106 during the second time period. In some embodiments, the system 102 may obtain a pair of images captured during the same time period (e.g., second time period).

Then, the method 1000 includes generating 1004 image information regarding the image or images obtained in 1002. Generating 1004 the image information is performed as described with respect to 904 of the method 900 and elsewhere herein, so further discussion thereof is omitted.

In 1006, the method 1000 includes assessing differences between the image(s) obtained in 1002 and a previous image. The previous image is an image of the pair of images obtained in 902 that was captured during the first time period. The assessment in 1006 may include comparing the image information for corresponding images captured. With reference to FIG. 7, for instance, assessing 1006 differences may involve assessing the first image information 602 and the third image information 702 to determine differences therebetween. The system 102 may detect that there is a variance between the facial expression information 612*a* for the first face image 202 and the facial expression information 612*c* for the third face image 302. In some embodiments, the assessment 1006 may include detecting consistencies between image information for corresponding factors, such as detecting that the orientation information 608*a* for the first face image 202 is consistent with the orientation information 608*c* for the third face image 302.

The method 1000 includes determining 1008 whether one or more variances detected in the assessment of 1006 satisfy the criteria 706. The system 102 may determine whether there is a match between each of the variances detected in 1006 and criterion specified in the criteria 706. The criteria 706 may specify certain variances or differences that should be present between the images assessed in 1006. If the differences detected in 1006 match the variances specified in the criteria 706, the system 102 may verify 1010 that the difference(s) correspond to the conditions specified in the criteria 706. The system 102 may generate and store verification information in connection with the verification 1010 indicating that the difference(s) satisfy the criteria 706. The verification information may be evaluated in connection with a result of the process 700 or the method 900 to determine whether to authorize performance of the authentication process in 810. As a result of generating the verification information in 910 and 1010, the system 102 may initiate or authorize the performance 810 of the authentication process in the method 800. In some embodiments, the system 102 may, as a precondition for performing 810 the authentication process, generate verification information in 1010 for a first pair of face images captured during sequential time periods by the first camera 104 (e.g., the first face image 202 and the third face image 302) and a second pair of face images captured during sequential time periods by the second camera 106 (e.g., the second face image 204 and the fourth face image 304).

As a result of determining in 1008 that the pair of face images obtained in 1002 fail to satisfy the criteria 706, the system 102 may return 1012 a negative verification result for the assessment in 1008. Returning 1012 the negative verification result may cause the system 102 to fail 812 the authentication attempt.

In some embodiments, the method 1000 may include verifying in 1008 a difference between biometric signatures generated for the pair of face images obtained in 1002 satisfies a criterion for variance in biometric signatures. The system 102 may, for example, generate a first biometric signature for the first face image 202 and generate a third biometric signature for the third face image 302. The system 102 may compare the first biometric signature and the third biometric signature and determine a difference therebetween. For instance, the difference between the biometric signatures may be a distance in Euclidean space between the first biometric signature and the third biometric signature. The distance between the biometric signatures may be an indicator of whether the identity of the person depicted in the pair of face images is the same in both. The criteria 706 may include a criterion for consistency between biometric signatures for face image pairs. Generating the verification information in 1010 may be as a result of determining that the variance between the biometric signatures satisfies a criterion for biometric signature variance specified in the criteria 706. The variance for biometric signatures specified in the criteria 706 may be a range of distance in which the variance determined between the biometric signatures is located or a threshold distance that the difference in biometric signatures should exceed. Further description regarding generating biometric signatures and comparison thereof is described in U.S. patent application Ser. No. 16/262,590, filed Jan. 30, 2019, the entirety of which is incorporated by reference herein; and in U.S. Provisional Patent Application entitled "ADAPTIVE LEARNING AND MATCHING OF FACE MODALITIES" (RN463; Seed IP Ref: 780099.435), filed Apr. 5, 2019, the entirety of which is incorporated by reference herein.

The operations and procedures described with respect to the methods 800, 900, and 1000 may be performed in different orders than described or depicted. As an example, the system 102 may perform 810 the authentication process as a result of detecting the variance between a pair of facial images in 1008 and determining the consistency between a pair of facial images in 908. As another example, the authentication process performed in 810 may include determining an identity of a person depicted in one of the face images obtained in 804 or 806, and determining the consistency match in 908 is performed as a result of performing 810 the authentication process. As a further example, the authentication process performed in 810 may include determining an identity of a person depicted in one of the face images obtained in 804 and 806, and detecting or determining 1008 the variance between face images is performed as a result of performing 810 the authentication process.

In some embodiments, there may be more than two cameras than the first camera 104 and the second camera 106. For instance, the environment 400 of FIG. 4 may include a third camera positioned directly in front of and directed at the location the subject 108 is to be located, and may include a fourth camera positioned to the side of the location the subject 108 is to be located to capture a profile view of the face of the subject 108. The system 102 may randomly select pairs of the cameras that will capture the images during the first time period and the second time period. Accordingly, it may be more difficult for a person attempting to spoof an identity to know in advance which views of the person to display at any given time.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   obtaining a first image that includes a first depiction of a face captured during a first time period;
   obtaining a second image that includes a second depiction of the face captured during the first time period;
   obtaining a third image that includes a third depiction of the face captured during a second time period;
   obtaining a fourth image that includes a fourth depiction of the face captured during the second time period;
   detecting presence of a first variance in facial appearance between the first depiction of the face in the first image and the third depiction of the face in the third image;
   detecting presence of a second variance in facial appearance between the second depiction of the face in the second image and the fourth depiction of the face in the fourth image; and
   verifying liveness of a person based on a determination that the first variance in facial appearance corresponds in time to the second variance in facial appearance.

2. The method of claim 1, further comprising:
   wherein detecting the presence of the first variance in facial appearance between the first depiction of the face in the first image and the third depiction of the face in the third image includes:
      detecting the presence of the first variance in facial expression between the first depiction of the face in the first image and the third depiction of the face in the third image; and
   wherein detecting the presence of the second variance in facial appearance between the second depiction of the face in the second image and the fourth depiction of the face in the fourth image includes:
      detecting the presence of the second variance in facial expression between the second depiction of the face in the second image and the fourth depiction of the face in the fourth image.

3. The method of claim 1, further comprising:
   wherein detecting the presence of the first variance in facial appearance between the first depiction of the face in the first image and the third depiction of the face in the third image includes:
      detecting the presence of the first variance in face orientation between the first depiction of the face in the first image and the third depiction of the face in the third image; and
   wherein detecting the presence of the second variance in facial appearance between the second depiction of the face in the second image and the fourth depiction of the face in the fourth image includes:
      detecting the presence of the second variance in face orientation between the second depiction of the face in the second image and the fourth depiction of the face in the fourth image.

4. The method of claim 1, further comprising:
   wherein detecting the presence of the first variance in facial appearance between the first depiction of the face in the first image and the third depiction of the face in the third image includes:
      detecting the presence of the first variance in face size between the first depiction of the face in the first image and the third depiction of the face in the third image; and
   wherein detecting the presence of the second variance in facial appearance between the second depiction of the face in the second image and the fourth depiction of the face in the fourth image includes:
      detecting the presence of the second variance in face size between the second depiction of the face in the second image and the fourth depiction of the face in the fourth image.

5. The method of claim 1, further comprising:
   wherein detecting the presence of the first variance in facial appearance between the first depiction of the face in the first image and the third depiction of the face in the third image includes:
      detecting the presence of the first variance in facial appearance between the first depiction of the face in the first image and the third depiction of the face in the third image based on a set of criteria that specifies thresholds for analyzing a plurality of attributes of the facial appearance; and
   wherein detecting the presence of the second variance in facial appearance between the second depiction of the face in the second image and the fourth depiction of the face in the fourth image includes:

detecting the presence of the second variance in facial appearance between the second depiction of the face in the second image and the fourth depiction of the face in the fourth image based on the set of criteria.

6. The method of claim 1, further comprising:
wherein obtaining the first image includes:
capturing the first image via a first camera during the first time period;
wherein obtaining the second image includes:
capturing the second image via a second camera during the first time period;
wherein obtaining the third image includes:
capturing the third image via the first camera during the second time period that is sequential to the first time period; and
wherein obtaining the fourth image includes:
capturing the fourth image via the second camera during the second time period.

7. The method of claim 1, further comprising:
in response to verifying the liveness of the person, initiating an authentication process for the person.

8. A computing device, comprising:
a memory that stores computer instructions; and
a processor that executes the computer instructions to cause the computing device to:
obtain a first image that includes a first depiction of a face captured during a first time period;
obtain a second image that includes a second depiction of the face captured during the first time period;
obtain a third image that includes a third depiction of the face captured during a second time period;
obtain a fourth image that includes a fourth depiction of the face captured during the second time period;
detect presence of a first variance in facial appearance between the first depiction of the face in the first image and the third depiction of the face in the third image;
detect presence of a second variance in facial appearance between the second depiction of the face in the second image and the fourth depiction of the face in the fourth image; and
verify liveness of a person based on a determination that the first variance in facial appearance corresponds in time to the second variance in facial appearance.

9. The computing device of claim 8, wherein the processor executes the computer instructions further to cause the computing device to:
detect the presence of the first variance in facial appearance between the first depiction of the face in the first image and the third depiction of the face in the third image based on a facial expression depicted in the first image and third image; and
detect the presence of the second variance in facial expression between the second depiction of the face in the second image and the fourth depiction of the face in the fourth image based on the facial expression depicted in the second image and the fourth image.

10. The computing device of claim 8, wherein the processor executes the computer instructions further to cause the computing device to:
detect the presence of the first variance in facial appearance between the first depiction of the face in the first image and the third depiction of the face in the third image based on a face orientation depicted in the first image and third image; and detect the presence of the second variance in facial expression between the second depiction of the face in the second image and the fourth depiction of the face in the fourth image based on the face orientation depicted in the second image and the fourth image.

11. The computing device of claim 8, wherein the processor executes the computer instructions further to cause the computing device to:
detect the presence of the first variance in facial appearance between the first depiction of the face in the first image and the third depiction of the face in the third image based on a face size depicted in the first image and third image; and
detect the presence of the second variance in facial expression between the second depiction of the face in the second image and the fourth depiction of the face in the fourth image based on the face size depicted in the second image and the fourth image.

12. The computing device of claim 8, wherein the processor executes the computer instructions further to cause the computing device to:
detect the presence of the first variance in facial appearance between the first depiction of the face in the first image and the third depiction of the face in the third image based on a set of criteria that specifies thresholds for analyzing a plurality of attributes of the facial appearance; and
detect the presence of the second variance in facial appearance between the second depiction of the face in the second image and the fourth depiction of the face in the fourth image based on the set of criteria.

13. The computing device of claim 8, wherein the processor executes the computer instructions further to cause the computing device to:
capture the first image via a first camera during the first time period;
capture the second image via a second camera during the first time period;
capture the third image via the first camera during the second time period that is sequential to the first time period; and
capture the fourth image via the second camera during the second time period.

14. The computing device of claim 8, wherein the processor executes the computer instructions further to cause the computing device to:
in response to verifying the liveness of the person, initiate an authentication process for the person.

15. A system, comprising:
a first camera configured to capture images from a first orientation;
a second camera configured to capture images from a second orientation that is different from the first orientation;
a processor that executes computer instructions; and
a memory that stores the computer instructions, which when executed by the processor, cause the processor to:
capture, via the first camera, a first image that includes a first depiction of a face captured during a first time period;
capture, via the second camera, a second image that includes a second depiction of the face captured during the first time period;
capture, via the first camera, a third image that includes a third depiction of the face captured during a second time period;

capture, via the second camera, a fourth image that includes a fourth depiction of the face captured during the second time period;

detect presence of a first variance in facial appearance between the first depiction of the face in the first image and the third depiction of the face in the third image;

detect presence of a second variance in facial appearance between the second depiction of the face in the second image and the fourth depiction of the face in the fourth image; and verify liveness of a person based on a determination that the first variance in facial appearance corresponds in time to the second variance in facial appearance.

16. The system of claim 15, wherein the computer instructions, when executed by the processor, further cause the processor to:

detect the presence of the first variance in facial appearance between the first depiction of the face in the first image and the third depiction of the face in the third image based on a facial expression depicted in the first image and third image; and detect the presence of the second variance in facial expression between the second depiction of the face in the second image and the fourth depiction of the face in the fourth image based on the facial expression depicted in the second image and the fourth image.

17. The system of claim 15, wherein the computer instructions, when executed by the processor, further cause the processor to:

detect the presence of the first variance in facial appearance between the first depiction of the face in the first image and the third depiction of the face in the third image based on a face orientation depicted in the first image and third image; and detect the presence of the second variance in facial expression between the second depiction of the face in the second image and the fourth depiction of the face in the fourth image based on the face orientation depicted in the second image and the fourth image.

18. The system of claim 15, wherein the computer instructions, when executed by the processor, further cause the processor to:

detect the presence of the first variance in facial appearance between the first depiction of the face in the first image and the third depiction of the face in the third image based on a face size depicted in the first image and third image; and detect the presence of the second variance in facial expression between the second depiction of the face in the second image and the fourth depiction of the face in the fourth image based on the face size depicted in the second image and the fourth image.

19. The system of claim 15, wherein the computer instructions, when executed by the processor, further cause the processor to:

detect the presence of the first variance in facial appearance between the first depiction of the face in the first image and the third depiction of the face in the third image based on a set of criteria that specifies thresholds for analyzing a plurality of attributes of the facial appearance; and detect the presence of the second variance in facial appearance between the second depiction of the face in the second image and the fourth depiction of the face in the fourth image based on the set of criteria.

20. The system of claim 15, wherein the computer instructions, when executed by the processor, further cause the processor to:

in response to verifying the liveness of the person, initiate an authentication process for the person.

* * * * *